United States Patent
Ichikawa et al.

(10) Patent No.: US 8,755,641 B2
(45) Date of Patent: Jun. 17, 2014

(54) OPTICAL MODULATOR

(75) Inventors: Junichiro Ichikawa, Chiyoda-ku (JP);
Satoshi Oikawa, Chiyoda-ku (JP);
Hiroshi Murata, Takarazuka (JP);
Yasuyuki Ozeki, Minoh (JP)

(73) Assignee: Sumitomo Osaka Cement Co., Ltd., Chiyoda-ku, Tokyo (JP)

(*) Notice: Subject to any disclaimer, the term of this patent is extended or adjusted under 35 U.S.C. 154(b) by 140 days.

(21) Appl. No.: 13/413,432

(22) Filed: Mar. 6, 2012

(65) Prior Publication Data
US 2012/0230625 A1 Sep. 13, 2012

(30) Foreign Application Priority Data
Mar. 8, 2011 (JP) ................. 2011-050655

(51) Int. Cl.
G02F 1/035 (2006.01)
G02F 1/355 (2006.01)
G02F 1/05 (2006.01)
G02F 1/01 (2006.01)
G02F 1/35 (2006.01)

(52) U.S. Cl.
CPC ...... *G02F 1/3558* (2013.01); *G02F 2001/3548* (2013.01); *G02F 1/05* (2013.01); *G02F 1/0508* (2013.01)
USPC ....................... 385/3; 385/1; 385/2

(58) Field of Classification Search
CPC . G02F 1/3558; G02F 2001/3548; G02F 1/05; G02F 1/0508
USPC ........................................................... 385/3
See application file for complete search history.

(56) References Cited

U.S. PATENT DOCUMENTS

| | | | | |
|---|---|---|---|---|
| 5,278,924 A * | 1/1994 | Schaffner | ............ | 385/3 |
| 5,930,414 A * | 7/1999 | Fishman et al. | ................ | 385/11 |
| 5,973,816 A * | 10/1999 | Akiyama et al. | ............... | 359/237 |
| 5,982,530 A * | 11/1999 | Akiyama et al. | ............... | 359/279 |
| 6,091,535 A * | 7/2000 | Satoh | ............ | 359/239 |
| 6,211,999 B1 * | 4/2001 | Gopalan et al. | ................ | 359/326 |
| 6,393,172 B1 * | 5/2002 | Brinkman et al. | ............... | 385/16 |
| 6,501,867 B2 * | 12/2002 | Gates et al. | .................. | 385/2 |
| 6,654,520 B2 * | 11/2003 | Choi et al. | .................. | 385/37 |
| 7,058,241 B2 * | 6/2006 | Sugiyama et al. | ................ | 385/4 |

(Continued)

FOREIGN PATENT DOCUMENTS

| | | |
|---|---|---|
| JP | 2004-12714 A | 1/2004 |
| JP | 2010-226254 A | 10/2010 |
| WO | 2009/004683 A1 | 1/2009 |

OTHER PUBLICATIONS

Killey, R.I., et al., "Electronic Dispersion Compensation by Signal Predistortion Using Digital Processing and a Dual-Drive Mach-Zehnder Modulator," IEEE Photonics Technology Letters, vol. 17, No. 3 (Mar. 2005), pp. 714-716.

*Primary Examiner* — Rhonda Peace
(74) *Attorney, Agent, or Firm* — Taft, Stettinius & Hollister LLP

(57) ABSTRACT

An optical modulator includes: a substrate made of a material having an electro-optical effect; an optical waveguide formed on the substrate; and a modulation electrode for modulating an optical wave propagating through the optical waveguide, wherein emitted light emitted from the optical waveguide is guided by optical fiber, and polarization of the substrate is reversed in a predetermined pattern along the optical waveguide so as to provide waveform distortion having a characteristic opposite to a wavelength dispersion characteristic of the optical fiber.

3 Claims, 1 Drawing Sheet

(56) References Cited

U.S. PATENT DOCUMENTS

| | | | |
|---|---|---|---|
| 7,701,630 B2* | 4/2010 | Kissa et al. | 359/254 |
| 2002/0005980 A1* | 1/2002 | Yamaguchi et al. | 359/328 |
| 2002/0024716 A1* | 2/2002 | Furukawa et al. | 359/326 |
| 2002/0033993 A1* | 3/2002 | Furukawa et al. | 359/326 |
| 2002/0076155 A1* | 6/2002 | Choi et al. | 385/37 |
| 2003/0002766 A1* | 1/2003 | Pruneri et al. | 385/2 |
| 2003/0031400 A1* | 2/2003 | Pruneri | 385/14 |
| 2003/0039461 A1* | 2/2003 | How Kee Chun et al. | 385/140 |
| 2003/0116424 A1* | 6/2003 | Nihei | 204/164 |
| 2004/0095970 A1* | 5/2004 | Yamamoto et al. | 372/21 |
| 2004/0207903 A1* | 10/2004 | Apostolopoulos et al. | 359/321 |
| 2005/0078964 A1* | 4/2005 | Takahara et al. | 398/147 |
| 2006/0193558 A1* | 8/2006 | Nara et al. | 385/37 |
| 2006/0228065 A1* | 10/2006 | Burns | 385/3 |
| 2007/0280580 A1* | 12/2007 | Shiraishi et al. | 385/8 |
| 2008/0160175 A1* | 7/2008 | Lin et al. | 427/77 |
| 2008/0218846 A1* | 9/2008 | Chu et al. | 359/326 |
| 2009/0093982 A1* | 4/2009 | Kissa et al. | 702/97 |
| 2010/0033806 A1* | 2/2010 | Satoh et al. | 359/326 |
| 2012/0152892 A1* | 6/2012 | Morikawa et al. | 216/24 |
| 2012/0230625 A1* | 9/2012 | Ichikawa et al. | 385/3 |

* cited by examiner

OPTICAL MODULATOR

The present disclosure contains subject matter related to that disclosed in Japanese Priority Patent Application JP 2011-050655 filed in the Japan Patent Office on Mar. 8, 2011, the entire content of which is hereby incorporated by reference.

BACKGROUND OF THE INVENTION

1. Field of the Invention

The invention relates to an optical modulator, and more particularly, to an optical modulator for compensating for wavelength dispersion of optical fiber.

2. Description of Related Art

In the fields of optical communication or optical measurement, an optical signal wave modulated in an optical modulator is transmitted in an optical fiber. In the optical fiber, since the propagation velocity of light or the length of the propagation path is different depending on the wavelength, wavelength dispersion occurs and the waveform of the optical signal is distorted. Particularly, waveform distortion is very obvious in the SSMF which is a standard single mode fiber. As a result, the technology for compensating for wavelength dispersion of the optical fiber is indispensable in high-speed communications over 40 Gbps, high-speed wavelength multiplexing transmission systems, and the like.

As a method of compensating for dispersion, there are known methods of arranging dispersion compensation fiber immediately before a receiver of an optical signal, methods of using Fiber Bragg Grating (FBG) or optical etalon devices as disclosed in Japanese Unexamined Patent Application Publication No. 2004-12714 or using a digital signal processing circuit as disclosed in Japanese Unexamined Patent Application Publication No. 2010-226254 or Robert I. Kelley, et al., "Electronic Dispersion Compensation by Signal Predistortion Using Digital Processing and a Dual-Drive Mach-Zehnder Modulator," IEEE Photonics Technology letters, Vol. 17, No. 3, pp 714-'716, 2005. The digital signal processing circuit generates impulse responses for compensation in the digital signal processor depending on a change of a real part or an imaginary part related to the wavelength dispersion.

In the dispersion compensating fiber, the compensation precision is limited by the minimum unit of the amount of compensation. In the wavelength dispersion compensation of the light waves of wavelength division multiplexing (WDM) system, the optical device such as FBGs are separately needed as the wavelength dispersion compensators in order to compensate after dividing WDM light waves. In addition, the optical device of FBG and the like has not only the limitation to operation band of the wavelength but also the large optical loss. Furthermore, in the digital signal processing circuit, the high-speed processing over 40 Gbps is the difficult technical problem.

SUMMARY OF THE INVENTION

The object of the present invention is to provide an optical modulator capable of compensating for wavelength dispersion of optical fiber and applicable to high-speed transmission over several tens of Gbps.

In order to address the aforementioned problems, according to an aspect of the invention, there is provided an optical modulator including: a substrate made of a material having an electro-optical effect; an optical waveguide formed on the substrate; and a modulation electrode for having an optical wave propagating through the optical waveguide to be modulated, in which emitted light emitted from the optical waveguide is guided to optical fiber, and ferroelectric polarization of the substrate is reversed in a predetermined pattern along the optical waveguide so as to provide waveform distortion having a characteristic opposite to a wavelength dispersion characteristic of the optical fiber.

In the optical modulator described above, the optical waveguide may be a Mach-Zehnder type waveguide having two branch waveguides, a polarization reversal pattern formed in one of the branch waveguides have a pattern corresponding to real part responsiveness of an impulse response 1/h(t) for compensating for an impulse response h(t) of the optical fiber, the polarization reversal pattern formed in the other branch waveguide may be a pattern corresponding to imaginary part responsiveness of the impulse response 1/h(t), and optical waves passing through the two branch waveguides may be combined with a predetermined phase difference.

In the optical modulator described above, the impulse response h(t) of the optical fiber may be expressed as follows:

$$h(t) = \frac{1}{2\pi} \int H(\omega)\exp(-j\omega t)dt,$$

where, $H(\omega)$ denotes a transfer function of the optical fiber and is defined as $H(\omega)=\exp(j\beta(\omega)L)$, $\beta(\omega)$ denotes a phase constant of an optical wave propagating through the optical fiber, and L denotes a length of the optical fiber.

According to the present invention, there is provided an optical modulator including: a substrate made of a material having an electro-optical effect; an optical waveguide formed on the substrate; and a modulation electrode for having an optical wave propagating through the optical waveguide modulated, wherein emitted light emitted from the optical waveguide is guided by optical fiber, and polarization of the substrate is reversed in a predetermined pattern along the optical waveguide so as to provide waveform distortion having a characteristic opposite to a wavelength dispersion characteristic of the optical fiber. Therefore, if a characteristic opposite to waveform distortion caused by the wavelength dispersion of the optical fiber is provided in advance when the optical modulator converts the electric signal into the optical signal, it is possible to compensate for the deterioration of characteristics even when wavelength dispersion occurs in the optical fiber. In addition, it is possible to compensate for the waveform deterioration without depending on the wavelength and without using digital signal processing technology, therefore it is possible to provide the optical modulator applicable to high-speed transmission over several tens of Gbps.

According to the present invention, the optical waveguide has a Mach-Zehnder type waveguide having two branch waveguides, a ferroelectric polarization reversal pattern formed in one of the branch waveguides is a pattern corresponding to real part responsiveness of an impulse response 1/h(t) for compensating for an impulse response h(t) of the optical fiber, the polarization reversal pattern formed in the other branch waveguide is a pattern corresponding to imaginary part responsiveness of the impulse response 1/h(t), and optical waves passing through the two branch waveguides are combined with a predetermined phase difference. Therefore, it is possible to easily generate the optical wave for compensating for the wavelength dispersion of the optical fiber. In addition, it is possible to easily perform design and setting regarding the wavelength dispersion of various kinds of optical fiber by adjusting the polarization reversal pattern or the phase difference.

According to the present invention, it is possible to easily design and set the ferroelectric polarization reversal pattern for compensating for the wavelength dispersion depending on various kinds of the optical fiber or the lengths by using the impulse response h(t) of the optical fiber as expressed in the aforementioned equation.

DETAILED DESCRIPTION OF THE INVENTION

Hereinafter, preferable embodiments of the present invention will be described in detail.

Figure 1:
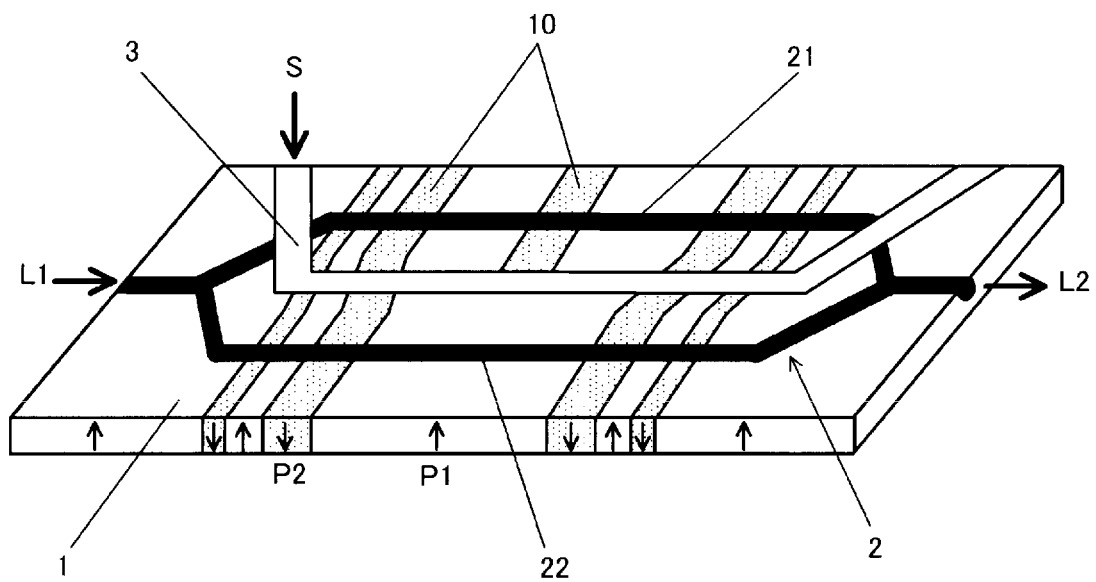
FIG. 1 is a diagram illustrating an example of the optical modulator according to the present invention.

As shown in FIG. 1, the optical modulator 1 includes a substrate 1 made of a material having an electro-optical effect; an optical waveguide 2 formed on the substrate; and a modulation electrode 3 for modulating an optical wave propagating through the optical waveguide. The emitted light L2 emitted from the optical waveguide is guided by optical fiber (not shown), and polarization of the substrate is reversed 10 in a predetermined pattern along the optical waveguide so as to provide waveform distortion having a characteristic opposite to a wavelength dispersion characteristic of the optical fiber.

As a substrate using a material having the electro-optical effect of the present invention, it is possible to use the substrate made of, for example, lithium niobate, lithium tantalate, electro optic polymer, and a combination thereof. Particularly, it is preferable that the material have a high electro-optical effect and be easy to form any ferroelectric polarization reversal structure. Specifically, the material includes lithium niobate, lithium tantalate, and an electro-optical polymer.

As a method of forming the optical waveguide 2 on the substrate, Ti and the like may be diffused on the substrate surface using a thermal diffusion method, a proton-exchange method, and the like. It may be possible to use a ridge-shaped waveguide in which a part corresponding to optical waveguide has a convex shape on the substrate by etching the substrate except the optical waveguide, forming the groove on both sides of the optical waveguide, and the like.

While the modulation electrode such as a signal electrode 3 or a ground electrode is formed on the substrate 1, such an electrode may be formed by formation of the electrode pattern of Ti.Au, a gold plating method, and the like. In addition, a buffer layer of the dielectric $SiO_2$ may be provided on the substrate surface after forming the optical waveguide as necessary, and the modulation electrode may be formed on the buffer layer. The reference symbol S in FIG. 1 denotes a modulation signal.

The optical fiber is optically combined in the optical modulator of the present invention. The optical fiber may be directly bonded to a substrate having an electro-optical effect using a capillary method or the like. Alternatively, a quartz substrate or the like forming the optical waveguide may be bonded to the substrate having an electro-optical effect, and the optical fiber may be bonded to such a quartz substrate or the like. Alternatively, the substrate having an electro-optical effect, the quartz substrate, or the like may be configured such that emitted light is introduced into the optical fiber through a spatial optical system.

In the optical modulator of the present invention, using the substrate made of a material having the electro-optical effect as shown in FIG. 1, a part of the substrate is subjected to the ferroelectric polarization reversal 10. The arrows P1 and P2 denote the ferroelectric polarization direction of the substrate. If such a ferroelectric polarization reversal structure is applied to the traveling-wave electrode electro-optical modulator, it is possible to obtain useful characteristics such as the pseudo-velocity matching, the complete zero-chirp intensity modulation, and the optical SSB modulation. The inventors have completed the present invention by focusing on the fact that the modulation frequency characteristic of the traveling wave electrode modulator having a ferroelectric polarization reversal structure is given by a Fourier transform of an impulse response directly corresponding to the polarization reversal pattern.

That is, it is possible to realize the optical modulator having a pre-equalizing function by using this characteristic as in the present invention. In addition, since in the optical modulator of the present invention does not require the group velocity of the modulated light and the phase velocity of the modulation signal to match each other unlike the typical baseband modulator, it is possible to response to ultrafast speed over several tens of GHz using the traveling-wave electrode having ultra-low loss with an enlarged cross-sectional area. In addition, it is possible to provide operation beyond the limitations of the electrical equalizing technique using high-speed A/D conversion technique such as the conventional digital signal processing circuit. In the optical modulator of the present invention, the high speed digital signal processing circuit is not needed. Therefore, it is possible to drive in low power consumption. Furthermore, it is possible to anticipate various applications such as phase rotation compensation of the transmission signal caused by the wavelength dispersion of the fiber.

Hereinafter, the description will be made by focusing on an optical modulator for performing the dispersion compensation of the optical fiber. In the optical modulator of the invention, the deterioration of characteristics is compensated for based on an electro-optical modulation technique using the polarization reversal, in which a characteristic opposite to waveform distortion caused by the wavelength dispersion of the electro-optical fiber is provided in advance when the optical modulator converts the electric signal into the optical signal.

The optical modulator of the present invention may be applied to high-speed transmission equal to or greater than several tens of Gbps or over 100 Gbps. It is also possible to compensate for the waveform deterioration without depending on wavelengths. As a result, it may be considered that the present invention is a breakthrough technology superior to the conventional dispersion compensation technique. The characteristic of the dispersion compensation technology of the present invention can be listed as follows:

(1) it is possible to respond to high-speed electrons over 40 Gbps which were difficult to respond in the digital signal processing technology, (2) there is no limitation in the wavelength range unlike the FBG method, and (3) it is possible to achieve integration with a data modulator.

There has been no technique of compensating for dispersion having the characteristics including the aforementioned (1) and (2) until now. The technology of the present invention, particularly, is excellent as the dispersion compensation technology in the high-speed wavelength multiplexing transmission system.

The dispersion compensation technique in the optical modulator of the present invention will be described in detail.

If a phase constant of an optical wave propagating through the optical fiber is set to $\beta(\omega)$, a transfer function $H(\omega)$ of the optical fiber of a length L is expressed as follows:

$$H(\omega)=\exp(j\beta(\omega)L).$$

In addition, considering, in the dispersion compensation, the second term of $\beta(\omega)$ expressed by a Taylor expansion in the vicinity of a carrier angular frequency of $\omega=\omega_0$, the function may be modified as follows:

$$H(\omega)=\exp(j\beta_2(\omega^2)L/2),$$

where, $\beta_2$ denotes a second term of Taylor expansion and defines the group velocity dispersion.

As a result, the impulse response h(t) of the optical fiber can be expressed as follows:

$$h(t) = \frac{1}{2\pi} \int H(\omega)\exp(-j\omega t)dt \qquad (1)$$
$$= \frac{1}{2\pi} \int \exp(j\beta_2 \omega^2 L/2)\exp(-j\omega t)dt$$
$$= \frac{1}{\sqrt{2\pi\beta_2 L}} \exp\left[j\left(-\frac{t^2}{2\beta_2 L}+\frac{\pi}{4}\right)\right]$$

In order to compensate for the dispersion of the optical fiber, since the transfer function for compensating for the dispersion of the optical fiber is expressed as $1/H(\omega)=H^*(\omega)$, the modulation corresponding to $h^*(t)(=1/h(t))$ which is the impulse response of the dispersion compensation may be performed in the optical modulator. Specifically, if an MZ interference type optical modulator having a Mach-Zehnder type waveguide in FIG. 1 is used, the modulation of real part responsiveness Re{h*(t)} of h*(t) is performed in one of the branch waveguides 21, the modulation of imaginary part responsiveness Im{h*(t)} is performed in the other branch waveguide, and both the modulation results are combined with a predetermined phase difference. It is preferable that the phase difference be set to 90°.

Figure 2:
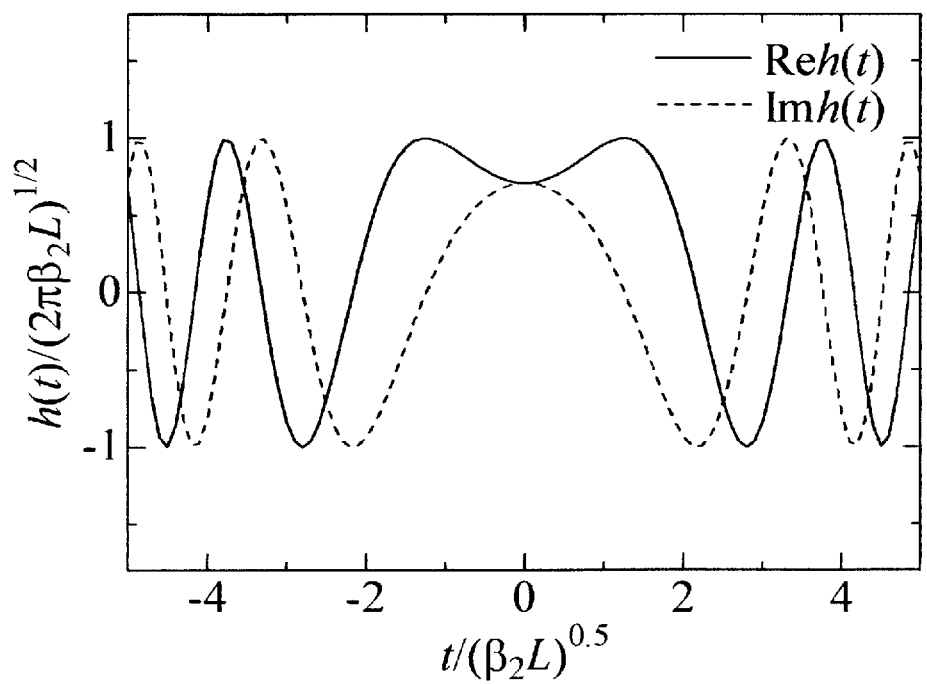
FIG. 2 is a graph representing an example of real part responsiveness (Reh*(t)) and imaginary part responsiveness (Imh*(t)) for compensating for the impulse response of optical fiber.

FIG. 2 is a graph illustrating the real part responsiveness Re{h*(t)} and the imaginary part responsiveness Im {h*(t)} of the impulse response h*(t) for compensating for the dispersion.

Generally, it is difficult to freely set the impulse responsiveness. However, it is possible to easily realize this impulse response if the polarization reversal structure is employed in a material having the primary electro-optical effect such as a ferroelectric material.

Specifically, as shown in FIG. 1, the optical waveguide 2 is a Mach-Zehnder type waveguide having two branch waveguides 21 and 22. A pattern of the polarization reversal 10 formed in one of the branch waveguides is a pattern corresponding to the real part responsiveness of the impulse response h*(t)(=1/h(t)) for compensating for the impulse response h(t) of the aforementioned optical fiber, and the polarization reversal pattern formed in the other branch waveguide is a pattern corresponding to the imaginary part responsiveness of the impulse response h*(t) for compensating for the dispersion.

The optical waves passing through two branch waveguides are combined with a predetermined phase difference. As the method of generating this phase difference, it may be possible to use a method of adjusting lengths of each branch waveguide or a method of adjusting the refractive index of the branch waveguide using the signal electrode or DC bias electrode arranged along the branch waveguide.

The optical modulator of FIG. 1 operates as the dispersion compensation modulator including the pre-equalizing capability. In addition, it is possible to compensate for the dispersion with higher precision using the double MZ modulator. Furthermore, it is possible to use the optical modulator with both QPSK modulation and duo-binary modulation.

According to the present invention, it is possible to provide an optical modulator capable of compensating for the wavelength dispersion of the optical fiber and applicable to the high-speed transmission over several tens of Gbps.

What is claimed is:

1. An optical modulator comprising:
    a substrate made of a material having an electro-optical effect;
    an optical waveguide formed on the substrate; and
    a modulation electrode for having an optical wave propagating through the optical waveguide modulated,
    wherein emitted light emitted from the optical waveguide is guided by optical fiber, and the substrate has a domain inversion formed in a predetermined pattern along the optical waveguide so as to provide waveform distortion having a characteristic opposite to a wavelength dispersion characteristic of the optical fiber.

2. The optical modulator according to claim 1, wherein the optical waveguide is a Mach-Zehnder type waveguide having two branch waveguides,
    a polarization reversal pattern formed in one of the branch waveguides is a pattern corresponding to real part responsiveness of an impulse response 1/h(t) for compensating for an impulse response h(t) of the optical fiber,
    the polarization reversal pattern formed in the other branch waveguide is a pattern corresponding to imaginary part responsiveness of the impulse response 1/11(t), and
    optical waves passing through the two branch waveguides are combined with a predetermined phase difference.

3. The optical modulator according to claim 2, wherein the impulse response h(t) of the optical fiber is expressed as follows:

$$h(t) = \frac{1}{2\pi} \int H(\omega)\exp(-j\omega t)dt,$$

where, $H(\omega)$ denotes a transfer function of the optical fiber and is defined as $H(\omega)=\exp(j\beta(\omega)L)$, $\beta(\omega)$ denotes a phase constant of an optical wave propagating through the optical fiber, and L denotes a length of the optical fiber.

* * * * *